US007009317B2

(12) United States Patent
Cronin et al.

(10) Patent No.: US 7,009,317 B2
(45) Date of Patent: Mar. 7, 2006

(54) COOLING SYSTEM FOR AN ELECTRIC MOTOR

(75) Inventors: Michael G. Cronin, Peoria, IL (US); Trevor Neal Iund, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/756,420

(22) Filed: Jan. 14, 2004

(65) Prior Publication Data
US 2005/0151431 A1    Jul. 14, 2005

(51) Int. Cl.
H02K 9/00    (2006.01)
(52) U.S. Cl. .............................. 310/54; 310/52; 310/57
(58) Field of Classification Search ............ 310/52–64, 310/260
See application file for complete search history.

(56) References Cited

U.S. PATENT DOCUMENTS

| | | | | |
|---|---|---|---|---|
| 1,985,040 A | | 12/1934 | Laffoon et al. ............... 310/61 |
| 2,175,913 A | | 10/1939 | Philipp ....................... 417/294 |
| 2,285,960 A | | 6/1942 | Fechheimer .................. 310/54 |
| 2,695,368 A | | 11/1954 | Kilbourne et al. ............ 310/64 |
| 2,698,911 A | | 1/1955 | Schaefer ...................... 310/86 |
| 2,964,659 A | * | 12/1960 | Steele, III et al. ............ 310/54 |
| 2,967,960 A | | 1/1961 | Waldschmidt ............... 310/86 |
| 2,975,309 A | | 3/1961 | Seidner ....................... 310/54 |
| 3,009,072 A | * | 11/1961 | Mossay ....................... 310/57 |
| 3,030,529 A | | 4/1962 | Jaeschke et al. .............. 310/53 |
| 3,075,103 A | | 1/1963 | Ward, Jr. ...................... 310/54 |
| 3,163,789 A | | 12/1964 | Rosenberg ................... 310/53 |
| 3,217,193 A | * | 11/1965 | Rayner ........................ 310/54 |
| 3,242,418 A | * | 3/1966 | Mela et al. ................... 322/28 |
| 3,260,872 A | | 7/1966 | Potter .......................... 310/54 |
| 3,497,736 A | | 2/1970 | Cuny et al. .................. 310/54 |
| 3,531,668 A | * | 9/1970 | Cathey ........................ 310/58 |
| 3,543,062 A | | 11/1970 | Banchieri .................... 310/54 |
| 3,562,564 A | | 2/1971 | Potter .......................... 310/54 |
| 3,567,975 A | * | 3/1971 | Biesack et al. ............... 310/54 |
| 3,569,752 A | | 3/1971 | Tomlinson ................... 310/54 |
| 3,577,024 A | | 5/1971 | Inagaki et al. ............... 310/54 |
| 3,596,120 A | | 7/1971 | Potter .......................... 310/41 |
| 3,597,645 A | | 8/1971 | Duffert et al. ............... 310/14 |
| 3,609,420 A | | 9/1971 | Inagaki et al. ............... 310/54 |
| 3,614,493 A | | 10/1971 | Collings et al. .............. 310/53 |
| 3,622,820 A | | 11/1971 | Tjernstrom .................. 310/54 |
| 3,648,085 A | | 3/1972 | Fujii ............................ 310/54 |
| 3,659,125 A | | 4/1972 | Basel .......................... 310/52 |
| 3,693,036 A | | 9/1972 | Schmitt ....................... 310/54 |
| 3,710,156 A | | 1/1973 | Laing .......................... 310/54 |
| 3,727,085 A | | 4/1973 | Goetz et al. ................. 310/54 |
| 3,740,595 A | | 6/1973 | Heller et al. ................. 310/52 |
| 4,066,203 A | | 1/1978 | Davies ..................... 228/180.1 |
| 4,199,700 A | | 4/1980 | Daugherty et al. .......... 310/71 |

(Continued)

Primary Examiner—Dang Le
(74) Attorney, Agent, or Firm—Finnegan, Henderson, Farabos, Garrett & Dunner LLP

(57) ABSTRACT

A cooling system for an electric motor includes a cooling duct formed between a cooling jacket and a separate component surface. The separate component surface may define at least a portion of a wall of the cooling duct. The cooling duct may be configured to direct a cooling liquid along at least a portion of the separate component surface and draw heat from the electric motor. An inlet port may be in fluid communication with the cooling duct. The inlet port may be configured to receive the cooling liquid and to introduce the cooling liquid to the cooling duct. An outlet port may be in fluid communication with the cooling duct.

30 Claims, 6 Drawing Sheets

U.S. PATENT DOCUMENTS

| | | | |
|---|---|---|---|
| 4,227,108 A | 10/1980 | Washizu et al. | 310/214 |
| 4,284,913 A | 8/1981 | Barnhardt | 310/54 |
| 4,323,803 A | 4/1982 | Danko et al. | 310/59 |
| 4,380,362 A | 4/1983 | Swensrud et al. | 439/487 |
| 4,492,889 A | 1/1985 | Fukushi et al. | 310/87 |
| 4,516,044 A * | 5/1985 | Bone | 310/64 |
| 4,647,805 A * | 3/1987 | Flygare et al. | 310/61 |
| 4,683,389 A * | 7/1987 | Readman et al. | 310/62 |
| 4,709,177 A | 11/1987 | Kaminski | 310/59 |
| 4,709,180 A | 11/1987 | Denk | 310/179 |
| 4,729,160 A | 3/1988 | Brown | 29/598 |
| 4,739,204 A | 4/1988 | Kitamura et al. | 310/68 D |
| 4,797,588 A | 1/1989 | Capion | 310/54 |
| 4,799,564 A | 1/1989 | Iijima et al. | 180/65.5 |
| 4,870,307 A | 9/1989 | Kitamura et al. | 310/54 |
| 4,894,575 A | 1/1990 | Nilsson et al. | 310/260 |
| 4,980,588 A | 12/1990 | Ogawa | 374/147 |
| 5,074,672 A | 12/1991 | Emery et al. | 310/54 |
| 5,084,642 A | 1/1992 | Katsuzawa et al. | 310/54 |
| 5,111,090 A | 5/1992 | Otake et al. | 180/65.5 |
| 5,127,485 A | 7/1992 | Wakuta et al. | 180/65.5 |
| 5,156,579 A | 10/1992 | Wakuta et al. | 475/161 |
| 5,217,085 A | 6/1993 | Barrie et al. | 184/104.1 |
| 5,223,757 A | 6/1993 | Staub et al. | 310/54 |
| 5,293,089 A | 3/1994 | Frister | 310/54 |
| 5,347,188 A | 9/1994 | Iseman et al. | 310/68 D |
| 5,363,002 A * | 11/1994 | Hernden et al. | 310/54 |
| 5,448,118 A | 9/1995 | Nakamura et al. | 310/54 |
| 5,491,371 A | 2/1996 | Ooi | 310/58 |
| 5,558,588 A | 9/1996 | Schmidt | 475/5 |
| 5,578,879 A | 11/1996 | Heidelberg et al. | 310/54 |
| 5,731,643 A | 3/1998 | Avakian et al. | 310/53 |
| 5,859,482 A * | 1/1999 | Crowell et al. | 310/58 |
| 5,869,912 A | 2/1999 | Andrew et al. | 310/54 |
| 5,889,342 A | 3/1999 | Hasebe et al. | 310/54 |
| 5,898,245 A | 4/1999 | Cochimin | 310/52 |
| 5,914,872 A | 6/1999 | Krämer | 363/141 |
| 5,929,543 A | 7/1999 | Zeyen et al. | |
| 5,931,757 A | 8/1999 | Schmidt | 475/2 |
| 5,943,918 A | 8/1999 | Reed, Jr. et al. | 74/661 |
| 6,046,520 A | 4/2000 | Betsch et al. | 310/54 |
| 6,121,698 A | 9/2000 | Sexton | 310/54 |
| 6,222,289 B1 | 4/2001 | Adames | 310/54 |
| 6,239,518 B1 | 5/2001 | Matsubara et al. | 310/58 |
| 6,239,520 B1 | 5/2001 | Stahl et al. | 310/61 |
| 6,262,503 B1 | 7/2001 | Liebman et al. | 310/64 |
| 6,268,668 B1 | 7/2001 | Jarczynski et al. | 310/52 |
| 6,288,460 B1 | 9/2001 | Fakult et al. | 310/52 |
| 6,317,963 B1 | 11/2001 | Powers et al. | 29/596 |
| 6,326,709 B1 | 12/2001 | Adelmann et al. | 310/52 |
| 6,329,731 B1 | 12/2001 | Arbanas et al. | 310/52 |
| 6,355,995 B1 | 3/2002 | Jeppesen | 310/52 |
| 6,358,173 B1 | 3/2002 | Klemen et al. | 475/5 |
| 6,362,545 B1 | 3/2002 | Prole et al. | 310/58 |
| 6,369,470 B1 | 4/2002 | Kylander et al. | 310/52 |
| 6,424,062 B1 | 7/2002 | Adelmann et al. | 180/65.4 |
| 6,450,275 B1 | 9/2002 | Gabriel et al. | 180/61 |
| 6,465,917 B1 | 10/2002 | Wetzel et al. | 310/61 |
| 6,489,697 B1 | 12/2002 | Ozawa et al. | 310/52 |
| 6,504,274 B1 | 1/2003 | Bunker et al. | 310/64 |
| 6,515,383 B1 | 2/2003 | Ognibene et al. | 310/52 |
| 6,515,384 B1 | 2/2003 | Kikuchi et al. | 310/58 |
| 6,522,045 B1 | 2/2003 | Ikeda et al. | 310/263 |
| 6,522,046 B1 | 2/2003 | Ikeda et al. | 310/263 |
| 6,538,351 B1 | 3/2003 | Semba et al. | 310/52 |
| 6,552,452 B1 | 4/2003 | Ferguson | 310/61 |
| 6,568,193 B1 | 5/2003 | Cahill | 62/3.2 |
| 6,570,276 B1 | 5/2003 | Morel et al. | 310/52 |
| 6,577,027 B1 | 6/2003 | Hayase et al. | 310/59 |
| 6,577,038 B1 | 6/2003 | Butman et al. | 310/201 |
| 6,579,202 B1 | 6/2003 | El-Antably et al. | 475/159 |
| 6,617,716 B1 | 9/2003 | Ishida | 310/58 |
| 6,621,185 B1 | 9/2003 | Riess | 310/54 |

* cited by examiner

COOLING SYSTEM FOR AN ELECTRIC MOTOR

TECHNICAL FIELD

The present disclosure is directed to a cooling system for an electric motor, and more particularly, to a cooling system for liquid cooling an electric motor.

BACKGROUND

Traditionally, electric motors have been used in stationary applications. Because of this, the volume or size of electric motors has not been critical, and sufficient cooling of the electric motors could be achieved by using air, with or without fins, and large motor housings, serving as heatsinks. More recently, electric motors have been used in mobile applications, such as on automobiles or work machines. Because mobile applications put a premium on smaller size and lower weight, these motors are more power dense and therefore more difficult to cool than their stationary counterparts.

As the size of the motors is decreased, air cooling alone is often insufficient to maintain temperatures of the motors at acceptable levels. Furthermore, because the motors are now often on mobile vehicles, they are subject to a variety of temperature ranges and environments. The air may be dusty or dirty, or the motors may become caked in mud, reducing the ability to air cool the motors. In order to maintain cooling consistency in different environments, electric motors have been developed using liquid cooling.

Initial designs for liquid cooled electric motors included forming fluid passages through the motor housings during casting. In use, as the housings draw heat from motor components in the housing, the heat was drawn away from the housing by the liquids forced through the housing passages. However, casting such passages in housings is difficult and expensive.

One attempt to solve the heating problem is shown in U.S. Pat. No. 5,931,757 to Schmidt. Schmidt discloses an electromechanical transmission for receiving power from an engine. It includes in its outer surface, a single annular channel where oil may accumulate next to a stator in an electric motor system. Although easier to manufacture than cast interior passages, such a single channel may not provide sufficient cooling for the electric motor, and may provide inconsistent heat zones in the stator.

The present invention is directed to overcoming one or more of the deficiencies in the prior art.

SUMMARY OF THE INVENTION

In one aspect, the present disclosure is directed to a cooling system for an electric motor. The cooling system may include a cooling duct formed between a cooling jacket and a separate component surface. The separate component surface may define at least a portion of a wall of the cooling duct. The cooling duct may be configured to direct a cooling liquid along at least a portion of the separate component surface and draw heat from the electric motor. An inlet port may be in fluid communication with the cooling duct. The inlet port may be configured to receive the cooling liquid and to introduce the cooling liquid to the cooling duct. An outlet port may be in fluid communication with the cooling duct.

In another aspect, the present disclosure is directed to an electric motor having a cooling jacket with an inner surface having at least one cooling groove. A stator may be disposed within the cooling jacket, and may have an outer surface in contact with at least a portion of the inner surface of the cooling jacket. The cooling groove and the outer surface of the stator may form a cooling duct. The cooling groove may be spiraled such that the cooling duct is configured to direct a cooling liquid at least partially in an axial direction.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

Figure 1:
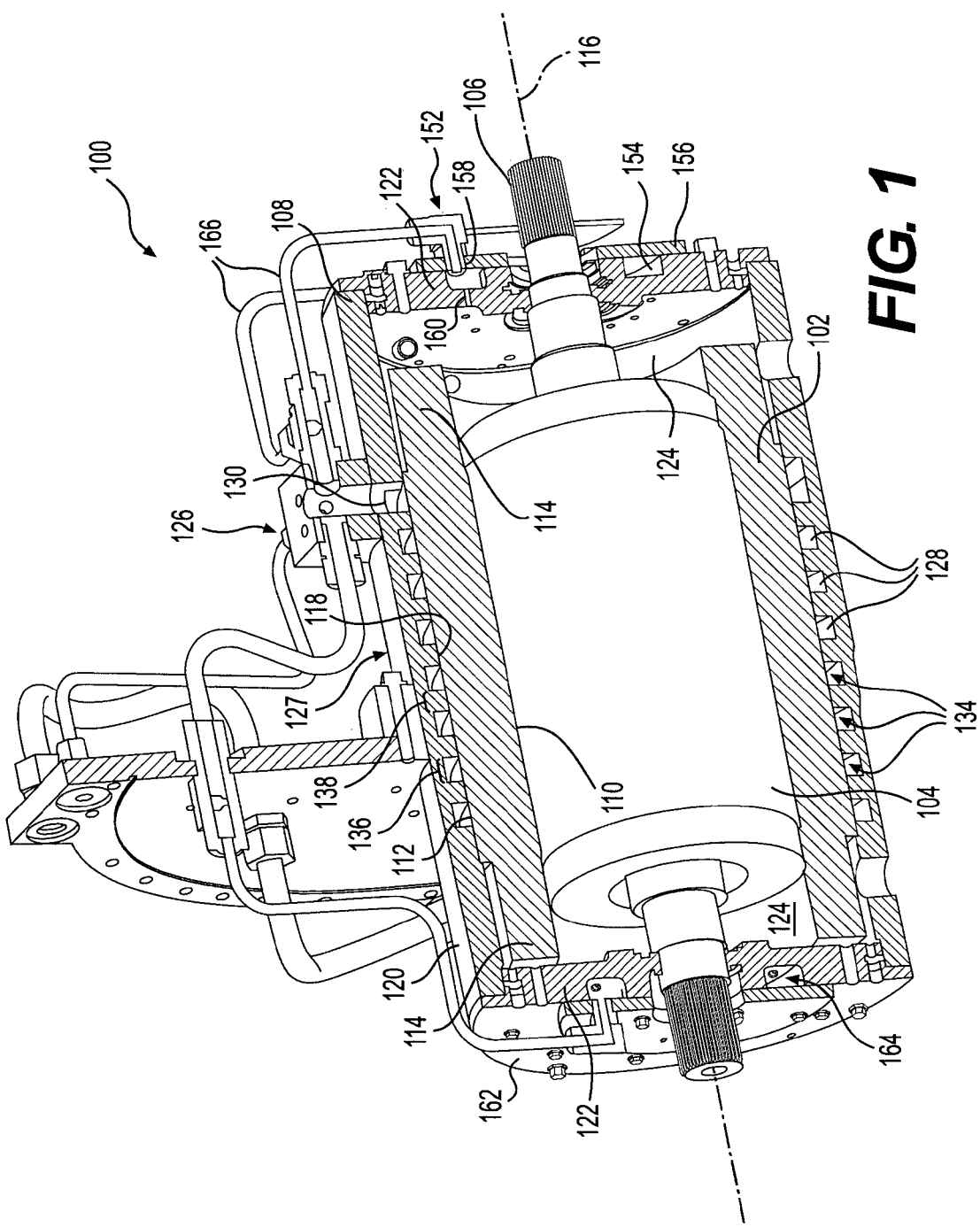
FIG. 1 is a pictorial representation of an electric motor in accordance with the present disclosure.

An exemplary embodiment of an electric motor 100 is illustrated in FIG. 1. The electric motor 100 may be used in any application requiring an electric motor, including a mobile application, such as on a work machine or other vehicle. The electric motor 100 may include a stator 102, a rotor 104, and a shaft 106, all housed in a cooling jacket 108.

The stator 102 may be formed of a series of thin laminates placed side-by-side, along with windings formed of conducting material. The stator 102 may have a cylindrical shape with an inner surface 110 and an outer surface 112. Each end of the stator 102 may include end windings 114, formed of a series of wound conductive material.

The rotor 104 may be housed within the stator 102. It may be formed of typical materials for an electric motor, and may be configured to rotate within the stator 108 to create torque. Formed in a cylindrical shape, the rotor 104 may have an open center to be attached to the shaft 106.

The shaft 106 may extend through the center of the rotor 104, and may define a motor axis 116. The motor axis 116 may be an axis for the stator 102, the rotor 104, and the cooling jacket 108. The shaft 106 may be fixed to the rotor 104 so that as the rotor 104 rotates, it drives the shaft 106. Likewise, when the shaft 106 rotates, it may drive the rotor 104.

The cooling jacket 108 may be a cylindrical housing for the stator 102. The cooling jacket has an inner surface 118 and an outer surface 120, and may be formed to be an interference fit onto the stator 102. Accordingly, the inner surface 118 of the cooling jacket 108 may be in direct contact with the outer surface 112 of the stator 102.

End plates 122 may connect to each end of the cooling jacket 108, sealing closed the ends of the motor 100. The inner surface 118 of the cooling jacket 108, together with the end plates 122, may define an operating region 124. The stator 102, the rotor 104 and the shaft 106 may be housed within the operating region 124.

The cooling jacket 108 may contain a cooling system 126 for reducing heat in the electrical motor 100. The cooling system 126 may include a groove system 127 and a fluid injector system 152. In the embodiment shown, the groove system 127 includes grooves 128 formed in the inner surface 118 of the cooling jacket 108. The grooves 128 may be formed to extend about the inner diameter of the cooling jacket 108, in a region in contact with the stator 102. Accordingly, the grooves 128 may extend around the outer surface 112 of the stator 102. In one exemplary embodiment, the grooves 128 may be spiraled along a length of the stator 102 in manner that the grooves extend, at least in part, axially along the motor 100.

An inlet port 130 and an outlet port 132 (represented in FIG. 2) may extend through the outer surface 120 of the cooling jacket 108 and may be in fluid communication with the groove 128. The inlet port 130 allows a cooling liquid, such as oil, to enter the grooves 128, while the outlet port 132 forms an exit path for the cooling liquid that has passed through the grooves 128.

The grooves 128 and the outer surface 112 of the stator 102 together define ducts 134. In the exemplary embodiment shown in FIG. 1, the ducts 134 include at least one surface formed of the outer surface 112 of the stator 102. The other surfaces of the ducts 134 are formed by the cooling jacket 108. The ducts 134 may be rectangular as shown, or alternatively, may have any other shape, such as, for example, a trapezoidal shape, or an arch shape.

The ducts 134 may be configured to receive and direct the cooling liquid around the stator 108. Because the ducts are formed in part by the grooves 128, the ducts 134 may be spiraled along the stator 102 so that one portion of the ducts 134 may be axially offset from another portion of the ducts 134. Accordingly, the cooling liquid in the ducts 134 may flow in an axial direction as well as a circumferential direction. The size of the ducts 134 are defined by the size of the grooves 128, which may be formed to allow the cooling liquid to flow through the ducts 134 at a velocity sufficient to provide a desired cooling capacity to the electric motor 100. Further, the spiral of the grooves 134 may provide even, distributed cooling along at least a portion of the length of the stator 102. The spirals can be connected in series with a small number of connections. This allows the fluid velocity to be maintained with a minimum of back pressure.

A groove width 136, representing the gap of the grooves 128, may be measured axially along the stator 102. The groove width 136 may be selected based upon a desired velocity and/or a desired cooling liquid flow through the ducts 134. In one exemplary embodiment, the grooves 128 may be formed to have a groove width 136 substantially the same as a land width 138. As used in this disclosure, the term "land width" is the axial distance of the inner surface 118 of the cooling jacket 108 between adjacent grooves 128. In some exemplary embodiments, a land width to groove width ratio may be within a ratio range of 2:3 and 3:2. In the exemplary embodiment shown, the land width to groove width ratio is about a one-to-one ratio. However, the grooves 128 may be formed to have any different land width to groove width ratio that is appropriate for a particular motor design.

Figure 2:
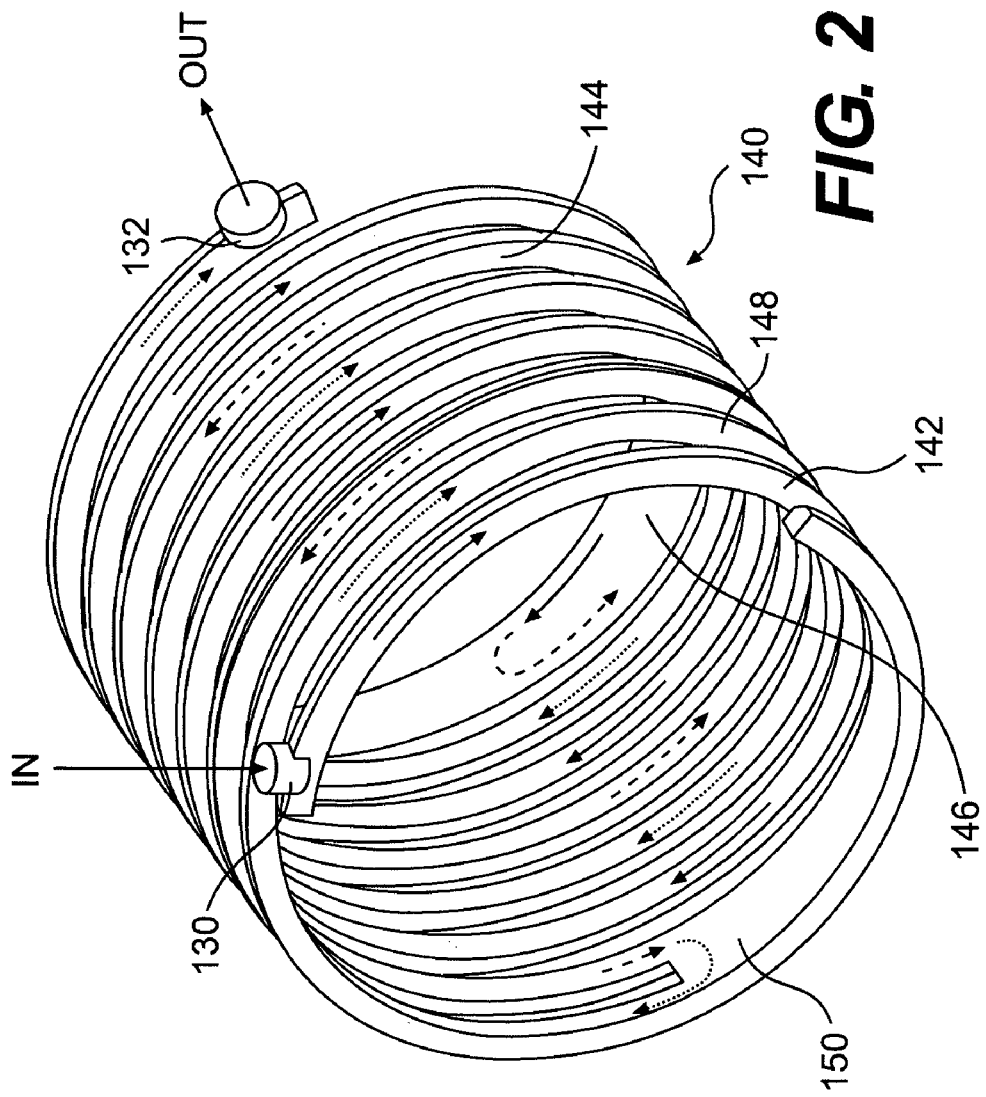
FIG. 2 is a pictorial representation of the cooling ducts formed by the stator and cooling jacket.

FIG. 2 shows one example of the ducts and a circulating pattern of a cooling liquid therethrough. In this exemplary embodiment, the ducts are formed in three spirals 140 extending from the inlet port 130 to the outlet port 132. Accordingly, the cooling liquid flows through the three spirals 140, designated with three arrow types. The three arrow types represent the direction of flow through the ducts, and may be used to distinguish one spiral duct from another.

From the inlet port 130, a pressurized cooling liquid may enter a first duct 142 having a solid arrow. The cooling liquid may be circulated through the first duct 142 for a length, such as, for example, two and one-half revolutions about the stator 102 (not shown in FIG. 2). The first duct 142 may merge with a second duct 144 designated by a dashed arrow at a first intersection 146 at one end of the cooling system 126. The cooling liquid flow may enter the second duct 144, flowing in a direction opposite that of the direction in the first duct 142.

The cooling liquid may be circulated through the second duct 144 for a length, such as, for example, two revolutions about the stator 102. The second duct 144 may merge with a third duct 148 designated by a dotted arrow at a second intersection 150 at a second end of the cooling system 126. The cooling liquid flow may again reverse directions and flow in a direction opposite that of the second duct 144. The cooling liquid may be circulated through the third duct 148 for a length, such as, for example, two and one-half revolutions about the stator 102. The outlet port 132 may be located at an end of the third duct 148, and may be configured to direct the cooling liquid out of the cooling system 126. Accordingly, although more than one cooling duct may extend along the stator 102, only one inlet port and only one outlet port are necessary to cool the stator 102.

Figure 3:
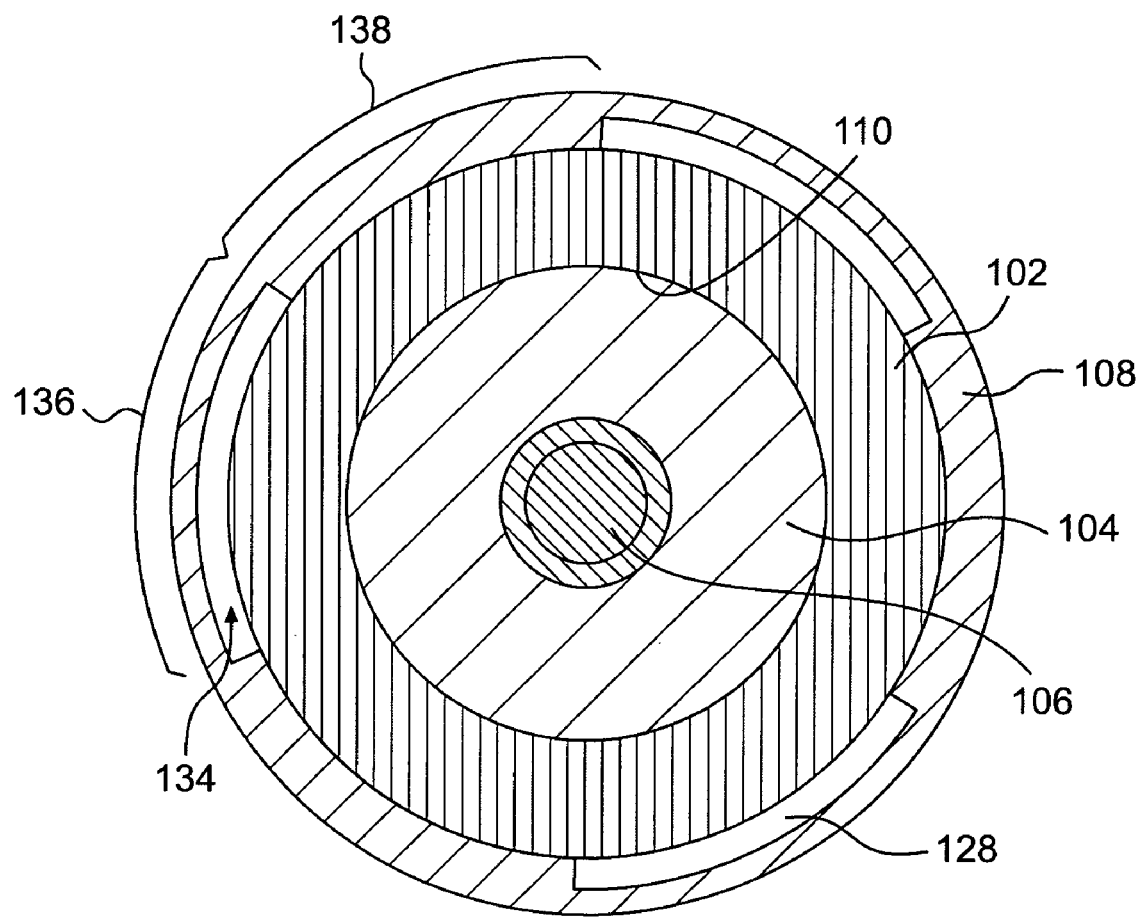
FIG. 3 is a pictorial cross-sectional view of an electric motor.

FIG. 3 is a transverse cross sectional view of the electric motor 100. As explained above, the exemplary embodiment described includes three grooves 128 formed in the cooling jacket 108 to create the ducts 134 between the cooling jacket 108 and the stator 102. In the embodiment shown, the three grooves 128 are spiraled and offset 120° apart. As explained above with reference to FIG. 1, the land width 138 may be substantially equivalent to the groove width 136, thereby providing substantially a one-to-one ratio. The three grooves 128 may effectively distribute the compression forces applied against the stator 102 by the interference fit cooling jacket 108 so that the laminates forming the stator 102 do not excessively move or change the shape of the inner surface 110. However, the cooling jacket 108 may include more or less than three grooves in the cooling system 126.

Returning to FIG. 1, the cooling system 126 of the electric motor 100 may also include a fluid injector system 152 to spray a cooling liquid on the stator 102 and/or the rotor 104. The fluid injector system 152 may include an annular ring 154 formed in the end plate 122, a sealing plate 156, and a port 158. The fluid injector system 152 may also include one or more fluid passages 160 serving as nozzles extending through the end plate 122.

The annular ring 154 in the end plate 122 may be formed about the axis 116 in an exterior surface 162 of the end plate 122. The sealing plate 156 may be attached to the exterior surface 162 of the end plate 122, and may be sized to fit over the annular ring 154, forming a cavity 164. The sealing plate 156 may be sealed against the end plate 122 such that any cooling liquid within the cavity 164 does not leak. The port 158 may be an inlet to the cavity 164, allowing the cooling liquid into the cavity 164.

The fluid passages 160 may extend through the end plate 122 from the cavity 164, and allow passage of the cooling liquid into the operating region 124 of the electric motor 100. The fluid passages 160 may have a relatively small diameter, allowing them to serve as nozzles that deliver the cooling liquid into the operating region 124. In one embodiment, the fluid passages 160 direct the cooling liquid directly at an end of the rotor 104. Accordingly, the cooling liquid may be used to maintain the operating temperature of the rotor 104 at an acceptable level. The passages 160 may extend through the end plate 122 in a direction to deliver cooling liquid on any desired area or component in the operating region 124. In one exemplary embodiment, the passages are configured to spray cooling liquid onto the end windings 114 of the stator 102.

Figure 4:
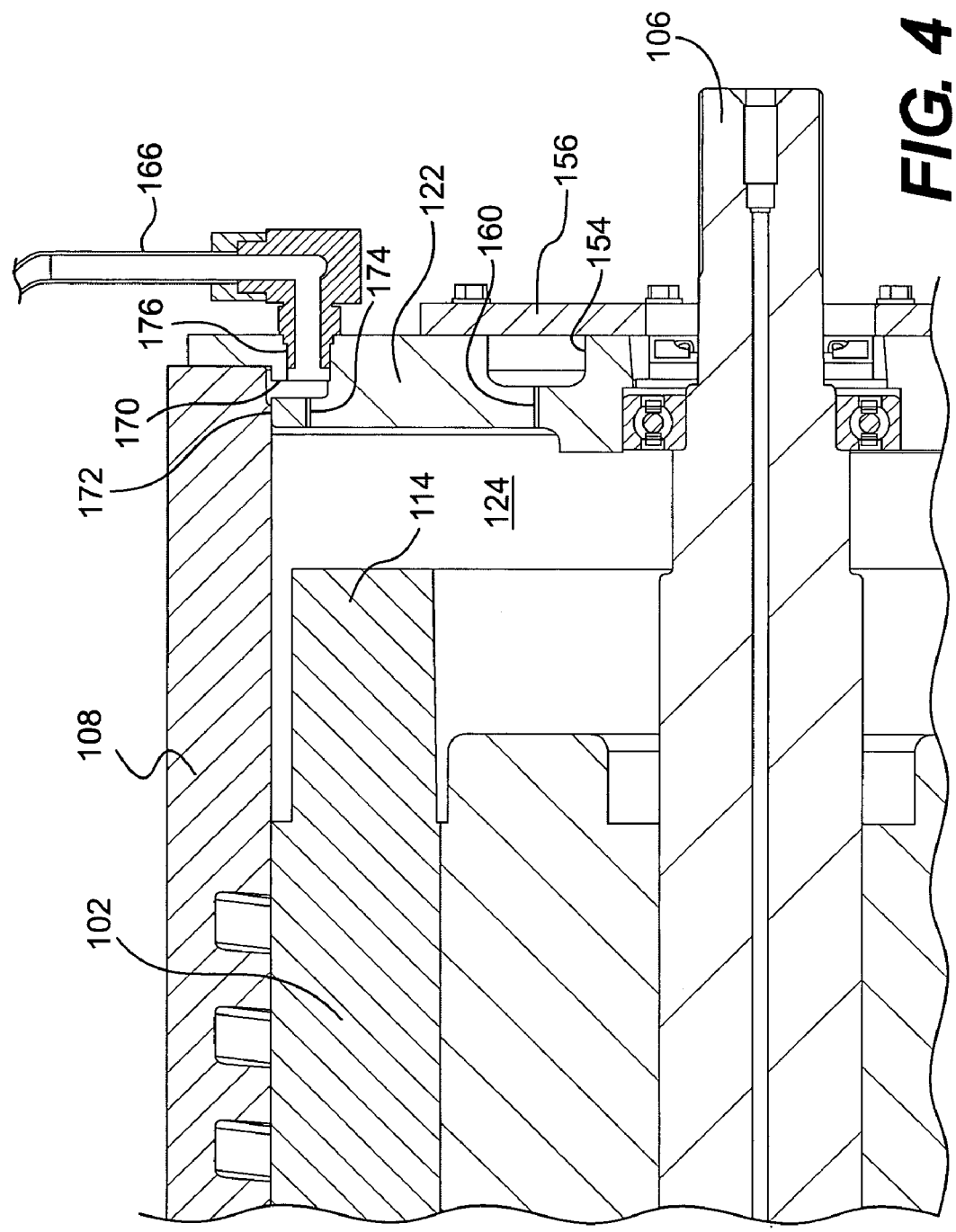
FIG. 4 is an enlarged pictorial cross-sectional view of a portion of the electric motor of FIG. 1.

In another exemplary embodiment, shown in FIG. 4, a second annular ring 170 may be formed in the end plate 122 at a radius that corresponds with the end windings 114 on the stator 102. In this exemplary embodiment, the second annular ring 170 is formed as a radial groove in an edge 172 of the end plate 122. The second annular ring 170 may be sealed between the cooling jacket 108 to form a second annular cavity. Second passages 174 may be formed through the end plate 122 for passage of cooling liquid from the second annular ring 170 into the operating region 124. An inlet port 176 may be formed in the end plate 122 to allow liquid to flow into the second annular ring 170, and through the second passages 174. Because the end windings 114 on the stator 102 may maintain a high temperature during operation of the motor 100, the passages may be located in a manner that delivers the cooling liquid directly on the end windings 114. It should be noted that any of the passages 160, 174 disclosed with reference to the present invention may include nozzles or inserts placed to direct cooling liquid from the annular rings 154, 170 into the operating region 124. Fluid piping 166 may direct the cooling liquid into the annular rings 154, 170 and/or the ports 130, 176, and may connect to a pump (not shown) to pressurize the cooling liquid.

Figure 5:
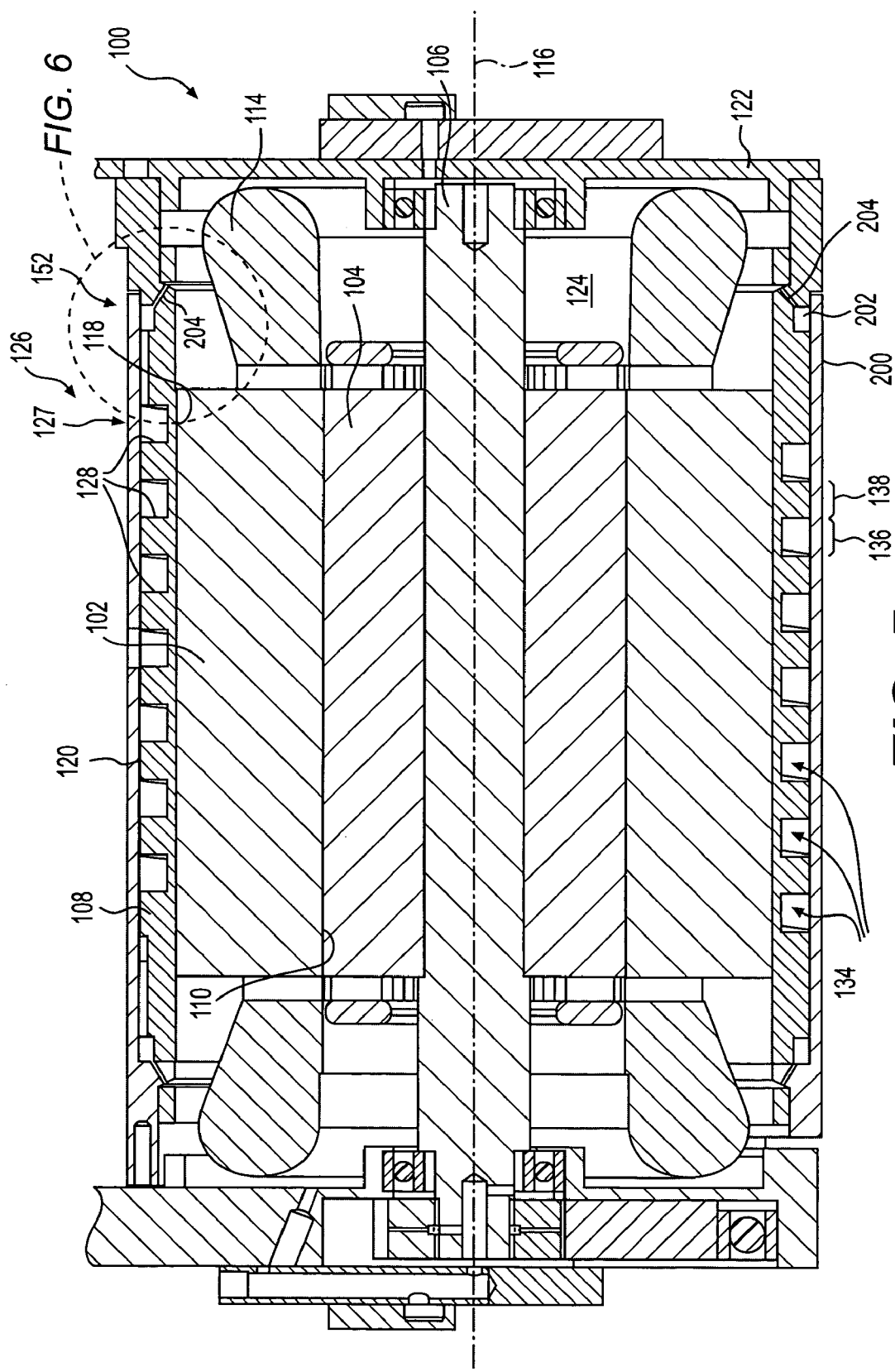
FIG. 5 is a pictorial cross-sectional view of a second embodiment of an electric motor.
Figure 6:
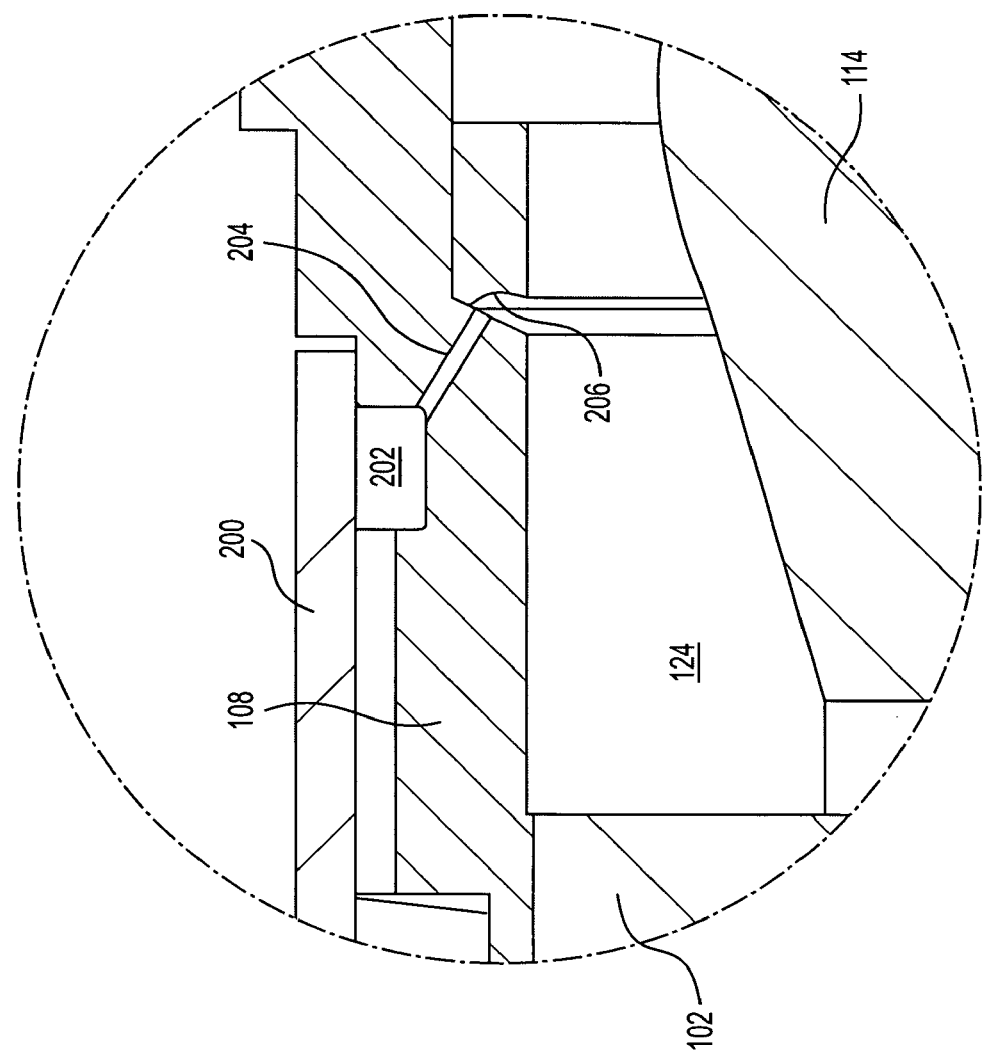
FIG. 6 is an enlarged pictorial cross-sectional view of a portion of the electric motor of FIG. 5.

FIGS. 5 and 6 show another exemplary embodiment of the electric motor 100. In this exemplary embodiment, the cooling jacket 102 includes grooves 128 formed in the outer surface 120 of the cooling jacket 108, rather than the inner surface 118. In this embodiment, an exterior sleeve 200 is placed around the outer surface 120 of the cooling jacket 108. The grooves 128 formed in the outer surface 120 of the cooling jacket 108, together with the exterior sleeve 200, form the ducts 134. Accordingly, in this embodiment, the ducts 134 are not formed against the stator 102, but instead are formed against the exterior sleeve 200.

As described above with reference to FIG. 1, the grooves 128 may be formed in a spiral shape about the cooling jacket 108. The inlet and outlet ports (not shown in FIGS. 5 and 6) provide fluid access to the ducts 134. In this exemplary embodiment, the inlet port may be formed through a central region of the cooling jacket 108 and the exterior sleeve 200 to provide access to the grooves 128. The grooves 128 may be formed to spirally separate in axially opposite directions away from the central region of the outer surface 120 of the cooling jacket 108. One advantage of forming the ducts 134 with the exterior sleeve 200, rather than the stator 102, is that when contaminates or debris enter the cooling ducts 134 with the cooling liquid, the exterior sleeve 200 may be easily removed to provide access to the grooves 128 for cleaning. Furthermore, manufacturing is simplified, as cooling grooves 128 formed in the outer surface 120 of the cooling jacket 108 are easier to form than cooling grooves 128 formed on the inner surface 118 of the cooling jacket 108.

In this exemplary embodiment, the fluid injector system 152 may include an annular ring 202 and passages 204. The annular ring 202 may be formed between the cooling jacket 108 and the exterior sleeve 200, and may be in fluid communication with an end of the cooling duct 134. The passages 204 may extend through the cooling jacket 108 between the annular ring 202 and the operating region 124 of the electric motor 100. These passages 204 may operate as nozzles as part of the cooling system 126 to allow the cooling liquid to spray onto the components within the operating region 124. In one embodiment, the passages 204 are configured to spray cooling fluid directly onto the end windings 114 of the stator 102.

As shown in FIG. 6, this exemplary embodiment may include a deflector 206 formed at an end of the passage 204. The deflector 206 may be formed of the cooling jacket 108, the end plate 122, or other portion of the motor 100. The deflector 206 may be shaped to deflect and spread the jet of cooling liquid from the passages 204 into a pattern to cool a larger area of the end windings 114. Deflecting the cooling liquid onto the end windings 114 of the stator 102 may reduce the possibility of erosion due to a continuous and direct flow of liquid onto the stator 102.

INDUSTRIAL APPLICABILITY

In use, the cooling liquid may be pressurized by a pump (not shown) and directed through the fluid piping 166 into the inlet port 130 and/or the port 158. The cooling liquid may be directed into the ducts 134 formed by the outer surface 112 of the stator 102 and the grooves 128 of the cooling jacket 108, or alternatively, by the exterior sleeve 200 and the grooves 128. The grooves 128 may be formed in a manner that directs the cooling liquid to pass over a length of the stator 102 in both an axial and a radial direction.

In one embodiment, the grooves 128 may be formed so that the cooling liquid passes back and forth in an axial direction along the outer surface of the stator 102. The cooling liquid may exit the ducts 134 from the outlet port 132.

In addition to cooling the electric motor 100 using the cooling ducts 134, passages 160, 204 may spray cooling oil directly to the ends of the stator 102 and/or the rotor 104. The cooling liquid may be pressurized by a pump and forced through fluid piping 166 into annular cavities 164 or rings 202 formed between end plates 122 and sealing plates 156, or between the exterior sleeve 200 and the cooling jacket 108. The pressurized cooling liquid may pass through the passages 160, 204 into the operating region 124 of the electric motor 100. The cooling liquid may be injected directly on the end windings 114 of the stator 102, as the end windings 114 may be one of the high temperature components in the electric motor 100. Cooling liquid sprayed on the rotor 104 may splash or may be flung radially outward toward the end windings 114 of the stator 102, cooling not only the rotor 104, but also the end windings 114 of the stator 102. Cooling liquid in the operating region 124 may be allowed to drain down into an oil pan at a bottom or end of the electric motor 100.

The system for cooling an electric motor may be used with any electric motor in any environment. It is particularly conducive to cooling electric motors used on mobile vehicles or in mobile applications. The cooling system increases the cooling efficiency of the motor without increasing the size or weight of the electric motor.

It will be apparent to those skilled in the art that various modifications and variations can be made in the disclosed system and method without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A cooling system for an electric motor, comprising:
a cooling duct formed between a cooling jacket and a separate component surface, the separate component surface defining at least a portion of a wall of the cooling duct, the cooling duct being configured to direct a cooling liquid along at least a portion of the separate component surface and draw heat from the electric motor, the cooling jacket at least partially defining an operating region of the electric motor;
an inlet port in fluid communication with the cooling duct, the inlet port being configured to receive the cooling liquid to introduce the cooling liquid to the cooling duct;
an outlet port in fluid communication with the cooling duct; and
an end plate adjacent the cooling jacket and having an annular ring and at least one fluid passage formed therein, the fluid passage being configured to direct cooling liquid directly from the annular ring into the operating region.

2. The cooling system of claim 1, wherein the separate component surface is an outer surface of a stator within the cooling jacket.

3. The cooling system of claim 2, wherein the cooling duct is spirally disposed thereby causing the cooling liquid to move at least partially in an axial direction of the motor along the outer surface of the stator.

4. The cooling system of claim 3, wherein the cooling jacket includes three cooling grooves formed in the cooling jacket, the three grooves forming the ducts.

5. The cooling system of claim 4, wherein the ducts are connected at intersections.

6. The cooling system of claim 1, wherein the separate component surface is an exterior sleeve disposed about the cooling jacket.

7. The cooling system of claim 6, wherein the cooling duct is spirally disposed thereby causing the cooling liquid to move at least partially in an axial direction of the motor.

8. The cooling system of claim 6, further including:
a second annular ring formed in the cooling jacket; and
at least one second passage extending from the second annular ring to the operating region defined at least in part by the cooling jacket.

9. The cooling system of claim 8, wherein the second annular ring is in fluid communication with the cooling ducts.

10. The cooling system of claim 9, wherein the at least one second passage is configured to direct a cooling liquid onto end windings of a stator.

11. A cooling system for an electric motor, comprising:
a cooling duct formed between a cooling jacket and a separate component surface, the separate component surface defining at least a portion of a wall of the cooling duct, the cooling duct being configured to direct a cooling liquid alone at least a portion of the separate component surface and draw heat from the electric motor, the cooling jacket at least partially defining an operating region of the electric motor;
an inlet port in fluid communication with the cooling duct, the inlet port being configured to receive the cooling liquid to introduce the cooling liquid to the cooling duct;
an outlet port in fluid communication with the cooling duct;
at least one passage connected to an annular ring, the annular ring being in fluid communication with the cooling duct, wherein the at least one passage is configured to direct the cooling liquid into the operating region; and
a deflector within the operating region at the end of the at least one passage, the deflector being configured to deflect the spray of the cooling liquid onto end windings of a stator.

12. An electric motor, comprising:
a cooling jacket having an inner surface with at least one cooling groove, the cooling jacket at least partially defining an operating region;
a stator disposed within the operating region, the stator having an outer surface in contact with at least a portion of the inner surface of the cooling jacket, wherein the cooling groove and the outer surface of the stator form a cooling duct,
wherein the cooling groove is spirally disposed such that the cooling duct is configured to direct cooling liquid at least partially in an axial direction of the motor; and
an end plate adjacent the cooling jacket and having an annular ring and at least one fluid passage formed therein, the fluid passage being configured to direct cooling liquid directly from the annular ring into the operating region.

13. The electric motor of claim 12, wherein the cooling jacket includes three cooling grooves.

14. The electric motor of claim 13, wherein the grooves are connected at intersections.

15. The electric motor of claim 12, wherein the at least one cooling groove has a groove width, and the distance between adjacent turns of the at least one cooling groove is a land width, and the groove width to land width ratio is between a ratio range of 2 to 3 and 3 to 2.

16. The electric motor of claim 12, further including at least one second fluid passage configured to inject the cooling liquid into the operating region, wherein the stator is disposed within the operating region.

17. The electric motor of claim 12, wherein the at least one fluid passage is configured to inject the cooling liquid onto at least one of the stator and a rotor within the stator.

18. An electric motor, comprising:
a cooling jacket having an outer surface with at least one cooling groove and at least partially defining an operating region;
an exterior sleeve disposed around the cooling jacket, the exterior sleeve and the cooling groove defining a cooling duct;
a stator disposed within the operating region, the stator having an outer surface in contact with at least a portion of the inner surface of the cooling jacket; and
an end plate adjacent the cooling jacket and having an annular ring and a plurality of fluid passages formed therein, the plurality of fluid passages being configured to direct fluid from the annular ring into the operating region.

19. The electric motor of claim 18, further including second passages in the cooling jacket configured to inject the cooling liquid into the operating region at least partially defined by the inner surface of the cooling jacket, wherein the stator and a rotor are disposed within the operating region.

20. The electric motor of claim 19, further including a second annular ring formed in the cooling jacket, the second passages extending from the second annular ring to the operating region defined at least in part by the cooling jacket.

21. The electric motor of claim 20, wherein the second annular ring is in fluid communication with the cooling ducts.

22. The electric motor of claim 21, wherein the second passages are configured to direct a cooling liquid onto end windings of the stator.

23. The electric motor of claim 22, further including a deflector formed at the end of at least one second passage, the deflector being configured to direct the spray of the cooling liquid onto the end windings of the stator.

24. The electric motor of claim 18, wherein the at least one cooling groove is spirally disposed and has a groove width, and the distance between adjacent turns of the at least one cooling groove is a land width, and the groove width to land width ratio is between a ratio range of 2 to 3 and 3 to 2.

25. An electric motor, comprising:
a cooling jacket having an inner surface defining an operating region;
a stator disposed at least partially within the operating region, the stator having an inner and outer surface;
a rotor disposed within the stator, the rotor being configured to rotate within the stator;
at least one fluid passage configured to inject a cooling liquid into the operating region to cool the stator and rotor; and
an end plate attached at an end of the electric motor, the end plate having an annular ring formed therein, the fluid passage being configured to direct fluid directly from the annular ring into the operating region.

26. The electric motor of claim 25, further including a second annular ring formed in the cooling jacket, and at least one second fluid passage configured to direct fluid from the second annular ring into the operating region.

27. The electric motor of claim 26, further including a cooling groove formed in the cooling jacket, the second annular ring being in communication with the cooling groove.

28. The electric motor of claim 25, further including a spiral cooling groove formed in th moling jacket, the spiral cooling groove being in contact with the stator.

29. A cooling system for an electric motor, comprising:
a cooling duct formed between a cooling jacket and a separate component surface, the separate component surface defining at least a portion of a wall of the cooling duct, the cooling duct being configured to direct a cooling liquid along at least a portion of the separate component surface and draw heat from the electric motor, the cooling jacket at least partially defining an operating region of the electric motor;
an inlet port in fluid communication with the cooling duct, the inlet port being configured to receive the cooling liquid to introduce the cooling liquid to the cooling duct;
an outlet port in fluid communication with the cooling duct; and
an end plate adjacent the cooling jacket and having an annular ring and a plurality of fluid passages formed therein, the plurality of fluid passages being configured to direct cooling liquid directly from the annular ring into the operating region.

30. An electric motor, comprising:
a cooling jacket having an inner surface defining an operating region;
a stator disposed at least partially within the operating region, the stator having an inner and outer surface;
a rotor disposed within the stator, the rotor being configured to rotate within the stator;
a plurality of fluid passages configured to inject a cooling liquid into the operating region to cool the stator and rotor; and
an end plate attached at an end of the electric motor, the end plate having an annular ring formed therein, the plurality of fluid passages being configured to direct fluid directly from the annular ring into the operating region.

* * * * *

UNITED STATES PATENT AND TRADEMARK OFFICE
CERTIFICATE OF CORRECTION

| | | |
|---|---|---|
| PATENT NO. | : 7,009,317 B2 | Page 1 of 1 |
| APPLICATION NO. | : 10/756420 | |
| DATED | : March 7, 2006 | |
| INVENTOR(S) | : Michael G. Cronin et al. | |

It is certified that error appears in the above-identified patent and that said Letters Patent is hereby corrected as shown below:

Column 7,
Line 56, delete "alone" and insert -- along --.

Column 9,
Line 40, delete "th moling" and insert -- the cooling --.

Signed and Sealed this

Twentieth Day of June, 2006

JON W. DUDAS
*Director of the United States Patent and Trademark Office*